United States Patent [19]
Mody et al.

[11] Patent Number: 5,605,729
[45] Date of Patent: Feb. 25, 1997

[54] LOOP FASTENER MATERIAL STORAGE/DISPENSING ASSEMBLY

[75] Inventors: Kirit C. Mody, Shoreview; Roy D. Erickson, Woodbury; Stephen P. Polski, Shoreview, all of Minn.

[73] Assignee: Minnesota Mining and Manufacturing Company, St. Paul, Minn.

[21] Appl. No.: 374,920

[22] Filed: Jan. 19, 1995

Related U.S. Application Data

[63] Continuation of Ser. No. 48,845, Apr. 16, 1993, abandoned.

[51] Int. Cl.$^6$ .............................. B32B 3/02; A44B 1/04; A61F 13/02

[52] U.S. Cl. ................ 428/37; 428/40.1; 428/41.4; 428/41.8; 428/42.3; 428/86; 428/95; 428/96; 428/100; 428/101; 428/343; 428/352; 428/354; 428/906; 24/306; 24/442; 24/448; 24/450; 156/66

[58] Field of Search .................... 428/86, 100, 101, 428/37, 40, 42, 95, 96, 906, 343, 352, 354, 40.1, 41.4, 41.8, 42.3; 24/306, 442, 448, 450; 156/66

[56] References Cited

U.S. PATENT DOCUMENTS

| | | | |
|---|---|---|---|
| 2,532,011 | 11/1950 | Dahlquist et al. | 154/53.5 |
| 3,583,057 | 6/1971 | Kolozvary | 425/100 |
| 3,703,739 | 11/1972 | Young et al. | 24/442 |
| 3,849,840 | 11/1974 | Yamada et al. | 428/100 |
| 4,290,174 | 9/1981 | Kalleberg | 428/100 |
| 4,313,988 | 2/1982 | Koshar et al. | 428/40 |
| 4,454,183 | 6/1984 | Wollman | 428/100 |
| 4,482,687 | 11/1984 | Noshay et al. | 526/125 |
| 4,624,116 | 11/1986 | Rogers | 66/193 |
| 4,732,631 | 3/1988 | Shimizu | 24/448 |
| 4,761,318 | 8/1988 | Ott et al. | 428/85 |
| 4,931,343 | 6/1990 | Becker et al. | 428/95 |
| 4,973,326 | 11/1990 | Wood et al. | 604/391 |
| 4,994,054 | 2/1991 | Pigneul et al. | 604/391 |
| 5,015,251 | 5/1991 | Cherubini | 24/442 |
| 5,019,071 | 5/1991 | Bany et al. | 604/389 |
| 5,032,122 | 7/1991 | Noel et al. | 604/391 |
| 5,058,247 | 10/1991 | Thomas et al. | 24/448 |
| 5,100,400 | 3/1992 | Mody et al. | 604/391 |
| 5,149,573 | 9/1992 | Kobe et al. | 428/100 |

FOREIGN PATENT DOCUMENTS

| | | |
|---|---|---|
| 0250248 | 12/1987 | European Pat. Off. . |
| 2364004 | 4/1978 | France . |
| 1080653 | 8/1967 | United Kingdom . |
| WO92/01401 | 2/1992 | WIPO . |
| WO92/15626 | 9/1992 | WIPO . |

*Primary Examiner*—Terrel Morris
*Attorney, Agent, or Firm*—Gary L. Griswold; Walter N. Kirn; Robert H. Jordan

[57] ABSTRACT

A storage/dispensing assembly, e.g., a roll or stack, of loop fastener material such as is used in hook and loop fastening system comprising one or more multilayer sheets of loop fastener material arranged such that the adhesive layer of an overlying portion of the loop fastener material is in direct contact with the loop layer of an underlying portion of the loop fastener material. The loops are such that, when the overlying portion of the loop fastener material is removed from the assembly, the loops of the underlying portion are presented in an engagable state. Also, a method for dispensing such loop material from such assemblies such that as the adhesive layer of the overlying portion is separated from the loops of the underlying portion, the loops of the underlying portion are presented in an engagable state.

35 Claims, 1 Drawing Sheet

LOOP FASTENER MATERIAL STORAGE/DISPENSING ASSEMBLY

This is a continuation of application Ser. No. 08/048,845, filed Apr. 16, 1993, now abandoned.

FIELD OF INVENTION

The present invention relates to loop fastener material including loops adapted to be releasably engaged by mating fastener portions which may include hooks or headed stems wherein the loop fastener material is arranged in a storage/dispensing assembly, e.g., a roll or stack.

BACKGROUND

Fastener portions (called "loop fastener material or materials" herein) comprising loops adapted to be releasably engaged by other fastener portions which may include hook or headed stems (collectively called "hook fastener material or materials" herein) are well known in the art. Loop fastener materials typically comprise a sheetlike fibrous structure of upstanding loops anchored to a base layer on a first major surface. The fibrous structure may be formed by any of several methods such as weaving, knitting, warp knitting, weft insertion knitting, circular knitting, stitching, or the known methods for making nonwoven structures. In order to attach the loop fastener material to a desired substrate, it is known to provide a layer of adhesive, e.g., a pressure-sensitive adhesive or a heat-activated adhesive, on the second major surface of the loop fastener material. Such loop fastener material may also comprise a substantially continuous backing between the fibrous structure and the adhesive layer. Illustrative examples of loop fastener materials are disclosed in U.S. Pat. No. 4,624,116 (Rogers), U.S. Pat. No. 4,761,318 (Ott et al.), U.S. Pat. No. 4,931,343 (Becker et al.), U.S. Pat. No. 4,973,326 (Wood et al.), and U.S. Pat. No. 5,032,122 (Noel et al.), and PCT Application No. WO 9201401 (Gorman).

In order to arrange an adhesive-backed loop fastener material in storage/dispensing assembly, e.g., a roll or one or more sheets or a stack of individual sheets, it is notorious to provide a release liner covering the adhesive layer. When arranged in the storage/dispensing assembly, the release liner separates the adhesive layer and facing fibrous structure. The release liner is used to protect the adhesive layer. Also, it is relied upon to prevent the adhesive layer from fouling the loops of the loop fastener material such that they can be releasably engaged when the fastener material is used.

When the loop fastener material is to be used, e.g., applied to a substrate such as a diaper or garment, the release liner is removed and typically discarded. With heightened concern over environmental issues and disposal costs, many users now demand that suppliers take back used liner materials. In addition, rolls of loop fastener material with release liner are typically unstable and subject to telescoping; accordingly they are usually provided with roll shields, i.e., wide plates or disks attached to the ends of the roll core.

The aforementioned U.S. Pat. No. 4,973,326 teaches at column 1, lines 46–52, that the "pressure-sensitive adhesive will adhere to the surface of the fastener material against which it is wound on the roll unless a release coating is provided on the fastener material, which is difficult and impractical, or unless the adhesive is covered by a release liner".

An additional problem with some loop fastener materials, especially low density versions used to reduce cost and/or exhibit a soft character (e.g., polyolefin-based loops), is that when they are arranged in a storage/dispensing assembly, the fibrous structure and loops are compressed such that when applied to a substrate their efficacy in engaging with complementary hook fastener material is reduced. To address this, it has been known to brush the loop portion of the loop fastener material to restore an open condition which will readily engage the complementary hook fastener material. The necessity of brushing presents an additional processing step and cost which lessens the desirability of using hook and loop fasteners.

SUMMARY OF INVENTION

The present invention provides a novel storage/dispensing assembly of loop fastener material such as is used in hook and loop fastening systems. The invention also provides novel method for dispensing such loop fastening material for desired use, e.g., application to a desired substrate.

Storage/dispensing assemblies of the invention comprise one or more multilayer sheets of loop fastener material suitable for use as the loop portion of a hook and loop fastener, wherein the loop fastener material comprises, in order: (1) a loop layer on the first major surface of the material that comprises (a) a multiplicity of flexible loops adapted to be releasably engaged by the complementary hook portion of the hook and loop fastener and (b) a base layer to which the loops are anchored, and (2) a pressure-sensitive adhesive layer on the second major surface of the material. If desired, the loop fastener material may further comprise a backing disposed between the loop layer and the adhesive layer. Assemblies of the invention differ from those known previously in that the loop fastener material is arranged in the assembly such that the adhesive layer of an overlying portion of the loop fastener material is in direct contact with the loop layer of an underlying portion of the loop fastener material. In some instances the loops are such that they can withstand being contacted by the overlying adhesive layer in the assembly substantially without being compressed and are capable of engaging complementary hook fastener material upon being dispensed. In other embodiments the loops are warped or compressed by the overlying adhesive layer when arranged in the storage/dispensing assembly but recover to an "engagable state" (i.e., to a state with sufficient loft to be engaged by a complementary hook fastener material) upon being dispensed. Depending upon the characteristics of the loop layer, the loops may recover sufficient loft to be restored to an engagable state upon being dispensed substantially solely as a result of their own inherent properties, or alternatively, the recovery of loft may be assisted through interaction with the overlying adhesive layer as described herein. Typically the assembly is in the form of either a stack comprising two or more sheets of loop fastener material or a roll comprising one or more sheets of loop fastener material wound convolutedly into roll form.

In brief summary, the novel method of the invention comprises: (1) providing a storage/dispensing assembly as described herein; and (2) removing an overlying portion of the loop fastener material from the assembly such that the adhesive layer of the overlying portion is separated from the loops of the underlying portion, thus presenting the loops in the underlying portion in an engagable state. If the loops are of a variety that is compressed when the loop fastener material is arranged in the storage/dispensing assembly, the loops must uncompress or recover in order to reach the engagable state. In a preferred embodiment of such materials, the adhesive of the overlying portion adheres sufficiently strongly to the loops of the underlying portion that when the overlying portion of the loop fastener material is removed from the assembly, the adhesive tends to pull the loops so as to restore them to an engagable state substantially without pulling them from the loop layer. Following removal from the assembly, the loop fastener material may be attached to a desired substrate using the adhesive layer.

Assemblies of the invention eliminate the familiar release liner, thereby reducing the weight and size of assemblies for a given quantity of loop fastener material and providing substantial shipping and handling cost savings, materials cost savings, and reduction of disposal needs while retaining the convenience of pressure sensitive adhesives. Assemblies of the invention exhibit greater stability than conventional assemblies, eliminating the need for special packaging and handling needs. In some embodiments, assemblies of the invention also eliminate the need for a special brushing step to restore the loop material's ability to releasably engage complementary hook fastener materials.

Some of the surprising aspects of this invention are that an effective release coating can be readily applied topically without resulting in degradation of the adhesive, that the pressure sensitive adhesive layer substantially retains its performance characteristics and does not require the protection afforded by a release liner, and that a roll of the invention can be unwound in easy fashion. It is also surprising that loop fastener materials made with compressible loops can be used in storage/dispensing assemblies of the invention and that the action of dispensing can be used to restore the loops to an engagable state; in some instances providing superior performance over similar fastener material rolled with a release liner.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
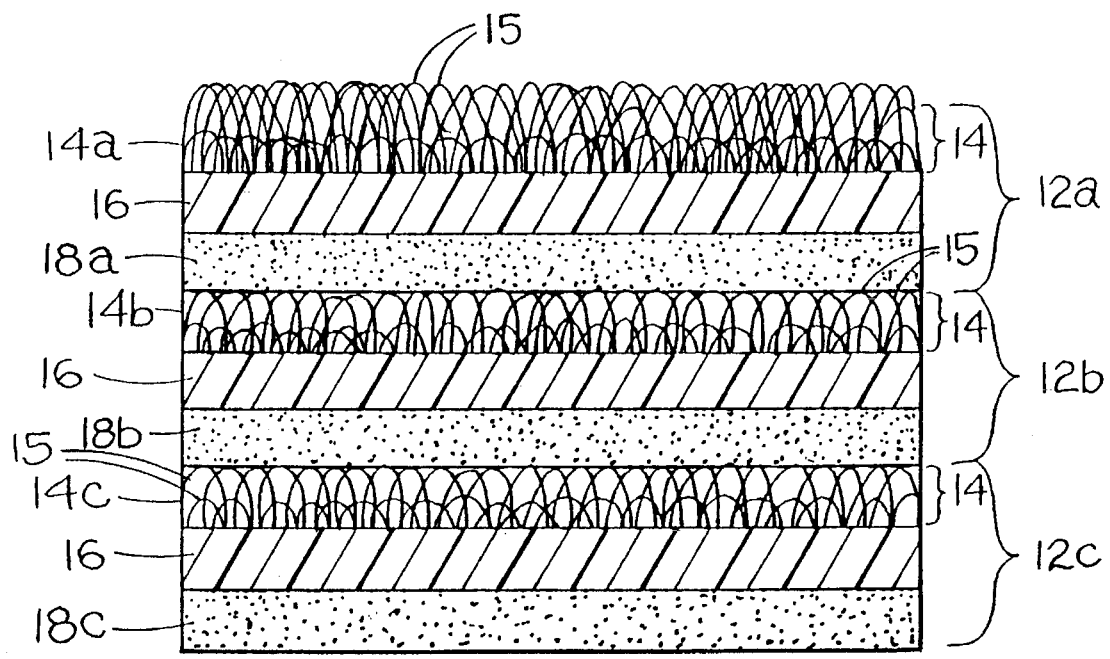
FIG. 1 is an cross-section of a portion of one embodiment of a storage/dispensing assembly of the invention.

An illustrative loop fastener material assembly of the invention is shown in FIG. 1. Assembly 10 comprises a stack of three multilayer sheets 12a, 12b, 12c of loop fastener material for the loop portion of a hook and loop fastener. The loop fastener material comprises in order: (1) loop layer 14 on its first major surface, loop layer 14 comprising (a) a multiplicity of flexible loops 15 adapted to be releasably engaged by the complementary hook portion (not shown) of the hook and loop fastener and (b) a base layer in which the loops are anchored, (2) optional backing 16, and (3) pressure-sensitive adhesive layer 18 on the second major surface of loop fastener material 12. The loop fastener material is arranged in assembly 10 such that adhesive layer 18a of overlying portion of loop fastener material is in direct contact with the loop layer 14b of an underlying portion of loop fastener material. The loops of loop layer 14b are such that, when the overlying portion 12a of loop fastener material is removed from assembly 10, the loops of the underlying portion are presented in an engagable state. In some embodiments, mere removal of the overlying portion such that the loops are accessible to be engaged by complementary hook material is sufficient. In other embodiments where the loops are compressed in the assembly, loops 14b must also recover from their compressed condition, either substantially solely through inherent properties or through assistance with adhesive layer 18a, in order to achieve an engagable state.

Loop fastener material used in assemblies of the invention may be made with a variety of loop materials. The loop materials used herein typically comprise a sheetlike fibrous structure with releasably engagable, upstanding loops which may be formed by any of several methods such as weaving, knitting, warp knitting, weft insertion knitting, stitching, or methods for making nonwoven structures. Typically the loop fastener material comprises a base layer with a multiplicity of loops extending therefrom.

Illustrative examples of loop materials suitable for use in assemblies of the invention include: knits (e.g., tricot knits, warp knits, weft inserted knits, circular knits, etc.), stitched materials, nonwoven materials, etc. For many applications, loop materials used in assemblies of the invention will have a basis weight between about 3 and 20 ounces/yard$^2$, be made of yarns between about 50 and 250 Denier, and/or be made of polyester, nylon, or combinations of such materials. Illustrative examples of loop fastener materials suitable for use in the present invention are disclosed in U.S. Pat. No. 4,624,116 (Rogers), U.S. Pat. No. 4,761,318 (Ott et al.), U.S. Pat. No. 4,931,343 (Becker et al.), U.S. Pat. No. 4,973,326 (Wood et al.) and U.S. Pat. No. 5,032,122 (Noel et al.), and PCT Application No. WO 9201401 (Gorman et al.). Such companies as Guilford Mills, Milliken Corporation, Kimberly-Clark Corporation, Hartwick Company, and Gehring Company supply loop materials suitable for use in the present invention. Suitable loop layer materials may be readily selected by those skilled in the art.

As discussed below, it may be desired to specifically control the adhesion between the loops of loop layer 14 and adhesive layer 18 to achieve desired release properties. This can be done using one or a combination of ways. First, adhesive 18 may be chosen for specific adhesion characteristics to a selected loop layer 14. Second, loop layer 14 may be specially chosen for specific interaction with the adhesive. The material of loop layer 14 may inherently exhibit the desired characteristics or it may be modified, e.g., by incorporation of a release control agent (e.g., as an additive in a polymeric composition or via graft polymerization) into the material from which loops are made and/or application of a release control agent onto the surface of the loops, prior to arranging the loop fastener material into assembly. Illustrative examples of incorporation-type release control agents include melt additives, graft polymerization such as the fluorochemical graft polymer disclosed in PCT Application No. WO 9215626 (Rolando et al.), etc. Illustrative examples of surface application, (i.e., topical) release agents include urethanes such as disclosed in U.S. Pat. No. 2,532,011 Dahlquist et al.), reactive silicones, fluorochemical polymers, epoxysilicones such as are disclosed in U.S. Pat. No. 4,313,988 (Bany et al.) and U.S. Pat. No. 4,482,687 (Kessel et al.), radiation curable polyorganosiloxane-polyurea block copolymers such as are disclosed in European Application No. 250248 (Leir et al.), etc.

As mentioned above, in some embodiments the loops are substantially not compressed by the overlying adhesive layer when the loop fastener material is arranged in a storage/dispensing assembly of the invention. For many used, however, it is desired to use loop fastener materials that are very soft and/or made of light weight materials. Such loops tend to be highly flexible and thus subject to being compressed when arranged in storage/dispensing assembly of the invention. One of the advantages of the invention, however, is that it can be used with more loop fastener materials that are very flexible. When the material is arranged in the storage/dispensing assembly, the loops are compressed by the overlying adhesive layer. After removal, the loops must recover in order to be readily engagable. In some instances, loops 14b are such that they will substantially recover (i.e., uncompress so as to substantially reacquire their preassembly loft) following removal of overlying portion 12a essentially without any contribution by the adhesive. Typically, however, it is preferred to utilize the action of overlying adhesive 18a to further the recovery of loops 14b. In such instances, the adhesive layer adheres sufficiently strongly to the loops that when the overlying portion of the loop fastener material is removed from the assembly, the adhesive tends to pull the loops so as to restore them to an engagable state.

The adhesion of the adhesive layer to the underlying loops is preferably low enough that the loops are substantially not pulled free from the loop layer when the adhesive layer is separated therefrom. If a substantial number of the loops do not remain anchored to the base layer and are pulled free, they may tend to contaminate the adhesive layer and degrade its adhesion properties as well as reduce the number of loops available for engagement by a complementary hook material, thereby reducing the strength of mechanical bond which can be obtained.

Figure 2:
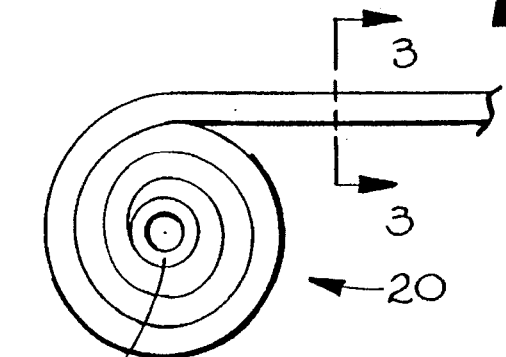
FIG. 2 is an edge view of another embodiment of a storage/dispensing assembly of the invention with a portion of dispensed loop fastener material.
Figure 3:
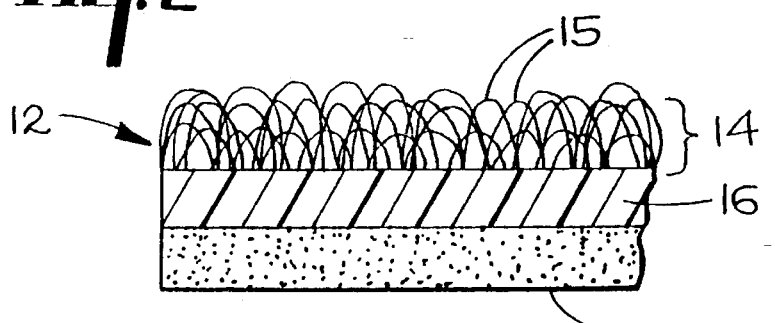
FIG. 3 is a cross-section of the dispensed loop fastener material of FIG. 2.

FIG. 2 illustrates another embodiment of the invention wherein storage/dispensing assembly 20 is a roll comprising one or more multilayer sheets of loop fastener material as described above wound convolutedly upon itself around core 22.

The adhesive typically exhibits a peel force to the loop layer of between about 4 and about 250 grams/centimeter-width, preferably between about 8 and 120 grams/centimeter-width, and most preferably between about 8 and about 80 grams/centimeter-width. As those skilled in the art will appreciate, embodiments of the invention may be made with peel forces outside these ranges if desired. Typically, however, the peel force should be less than the tear strength of the loop fastener material such that it can be readily dispensed from the assembly in usable fashion.

The roll typically exhibits an unwind force of between about 4 and about 250 grams/centimeter-width, and preferably between about 8 and about 120 grams/centimeter-width.

Adhesive layer 18 of loop fastener material of the invention is a pressure-sensitive adhesive. Selection of a suitable adhesive will be based in part on such factors as the substrate to which the fastener material is to be attached, the nature of the backing layer, the nature of the loop layer and its component loops, the desired properties of loop fastener material 12, the conditions of use to which the loop fastener material will be exposed, and available converting techniques and equipment for removing loop fastener material from the storage/dispensing assembly and conversion, e.g., cutting or slitting, to desired format. The adhesive should be tacky at room temperature, adhere as desired to intended substrates to which the loop fastener material is to be applied, adhere well to the backing or back of the loop layer base layer of the loop fastener material, and preferably not degrade upon exposure to air. Suitable adhesives for particular applications can be readily selected by those skilled in the art. Illustrative examples of suitable adhesives include: acrylates, tackified natural rubber, tackified synthetic rubber resins, etc. The adhesive layer might be substantially continuous or may be patterned if desired. Suitable adhesives can be readily selected by those skilled in the art.

In some instances, the base layer of the loop layer will impart desired sheet like properties to the loop fastener material, e.g., tear strength, tensile strength, flexibility, etc., as well as sufficient barrier between the adhesive layer and the loops to prevent the adhesive layer from blocking the loops so as to reduce the strength with which they can engage a complementary hook fastener material or migrating into the loop layer such that it provides insufficient adhesion to the desired substrate.

In some instances, however, an additional layer will be provided between the base layer of the loop layer and the adhesive layer. FIG. 1 shows optional backing 16.

Backing 16 can be used to provide a more amenable surface for adhesive layer 18 than the back surface of loop layer 14 might otherwise provide. In some instances, backing 16 will be a substantially continuous layer, providing a barrier between loop layer 14 and adhesive layer 18 to prevent undesirable blocking of the loops by the adhesive, e.g., during fabrication of the multilayer loop material when the adhesive may be more flowable than when the storage/dispensing assembly is assembled. U.S. Pat. No. 4,994,054 (Pigneul) addresses this issue. Backings may be selected to impart greater tensile and tear strength to the loop fastener material.

A suitable backing for a specific application may be readily selected by one skilled in the art. Selection of suitable backing is dependent in part upon the desired properties of loop fastener material 12, characteristics of loop layer 14 and adhesive layer 18 between which it is to be bonded, the conditions of use to which the loop material will be exposed, available converting techniques and equipment for removing loop fastener material from the storage/dispensing assembly and conversion, e.g., cutting or slitting, to desired format. Many materials commonly used as tape backings will be useful. Illustrative examples of materials suitable for use as backings herein include: polyolefins, polyesters, vinyls, blends thereof, paper, nonwoven webs, etc. If desired, multilayer backings can be used. If desired, foamed backings may be used.

Sometimes backing 16 is used to impart or define in large part the desired tensile strength of loop material 12. In most embodiments, backing 16 has a basis weight of between about 5.0 and about 400 grams/meter$^2$ sometimes between about 10 and about 200 grams/meter$^2$ and sometimes between about 20 and about 100 grams/meter$^2$.

In most embodiments, backing 16 has a thickness between about 5 and about 12,500 microns with the larger thicknesses typically being foam type backings. When the backing is, for example, a polyolefin sheet, thicknesses between about 25 and about 500 microns, sometimes between about 50 and 250 microns, will be common. It will be understood that backings of thicknesses outside these ranges may be desired in some instances.

The method of the invention for dispensing an "engagement-ready" loop fastener material comprises the steps of: (1) providing a storage/dispensing assembly as described above and (2) removing an overlying portion of the loop fastener material from assembly such that the adhesive layer of the overlying portion is separated from the loops of the underlying portion, permitting the loops of the underlying portion to be releasably engaged by a complementary hook fastener material.

As mentioned above, in some embodiments the adhesive of the overlying portion adheres sufficiently strongly to the loops of the underlying portion that when the overlying portion is removed from the assembly the adhesive tends to pull the loops so as to restore them to an engagable state.

In embodiments wherein the assembly is a stack comprising two or more sheets of loop fastener material, the method of removing an overlying portion of the loop fastener material may simply comprise peeling a sheet from the stack.

In embodiments wherein the assembly is a roll comprising one or more sheets of loop fastener material wound convolutedly, removing an overlying portion of the loop fastener material may simply comprise unwinding a portion of the loop fastener material from said roll. In some instances, it may be desired that the adhesive exhibit sufficiently strong adhesion to the loops that when the overlying portion is unwound, the adhesive of the overlying portion tends to pull loops of the underlying portion so as to restore them to engagable state. It may be desired that the roll exhibit a specified unwind force.

Typically, following removal of the portion of loop fastener material from the assembly, the portion of fastener material will be bonded or attached to a substrate with the adhesive layer.

Storage/dispensing assemblies of the invention can be made in a variety of sizes and embodiments as desired. Due to their surprising stability, roll-type assemblies of the invention using sheets of virtually any desired width can be readily made and handled. For instance, rolls made of sheets 2 inches (5 centimeters) wide or less are practically handled. Rolls will typically have a sheet width of at least 1 centimeter. Previously, rolls of sheets of such small widths were very difficult to handle because of the minimal interlayer adhesion that typically results from release liners. Rolls of sheets having greater widths may also be made in accordance with the invention. In addition, large volume rolls may be made, e.g., with a roll radius (i.e., the radius of loop fastener material measured in a radial direction from the center of the roll or core, if any) of 20 inches (0.5 meter) or more representing several hundred or thousand overlying layers of loop fastener material. Unlike conventional rolls of loop fastener material, roll-type assemblies of the invention may be made without the familiar side shields usually found attached to one or both ends of a roll core to help prevent telescoping of the roll during handling. Similarly, stack-type assemblies of the invention having similar dimensions may be made.

EXAMPLES

The invention will be further explained by the following illustrative examples which are intended to be nonlimiting.

The following tests were used to evaluate the linerless adhesive coated loop fastener material.
Dynamic Shear Strength Dynamic shear strength was measured using a constant rate tensile tester (INSTRON™ Model 1122). A 1 inch×3 inch (2.5 centimeters "cm"×7.6 cm) piece of hook fastener material was centrally placed on top of a 2 inch×2 inch (5.1 cm×5.1 cm) piece of loop fastener material such that the overlapping engaging area between the hook and loop fastener materials was 1 inch×1 inch (2.5 cm×2.5 cm). The sample was rolled down by hand, one pass in each direction, using a 4.5 pound (1000 gram) roller at a speed of approximately 12 inches (30.5 cm) per minute, to engage the complementary hook and loop materials. The sample was then placed in the jaws of the tensile tester with the free end of the strip of hook fastener material gripped in the upper jaw and the free end of the loop material gripped in the lower jaw with the shear line centered. At a crosshead speed of 5 inches (12.7 cm) per minute, a chart recorder set at a chart speed of 5 inches (12.7 cm) per minute recorded the maximum value obtained during complete separation of the hook fastener material from the loop fastener material. The shear load was reported in grams. Reported values are an average of at least five tests.
135° Peel Test A 2 inch×5 inch (5.1 cm×12.7 cm) piece of loop fastener material to be tested was securely placed on a 2 inch×5 inch (5.1×12.7 cm) steel panel by using a double-coated adhesive tape. A 1 inch×5 inch (2.5 cm×12.7 cm) piece of hook fastener material was cut and marks placed 1 inch (2.5 cm) from each end of the strip of hook fastener material. The strip of hook fastener material was then centrally placed on the loop panel so that there was a 1 *inch*×1 inch (2.5 cm×2.5 cm) contact area between the hooks and the loops and the leading edge of the strip of hook fastener material was along the length of the panel. The sample was rolled by hand, once in each direction, using a 4.5 pound (1000 gram) roller at a rate of approximately 12 inches (30.5 cm) per minute, to engage the complementary hook and loop fastener materials. Paper was used between the hooks and loop fastener materials to ensure a maximum 1 inch (2.5 cm) engagement. Holding the leading edge of the strip of hook material the sample was sheared slightly by hand approximately ⅛ inch (0.32 cm), engaging the hooks into the loops. The sample was then placed in a 135° peel jig. The jig was placed into the bottom jaw of an INSTRON™ Model 1122 tensile tester. Without pre-peeling the sample, the leading edge was placed in the upper jaw with the 1 inch mark at the bottom edge of the jaw. At a crosshead speed of 12 inches (30.5 cm) per minute, a chart recorder set at a chart speed of 20 inches (50.8 cm) per minute was used to record the peel which was maintained at 135°. An average of the four highest peaks was recorded in grams. The force required to remove the hook strip from the loop material was reported in grams/centimeter-width. Reported values are an average of at least five tests.
Unwind The roll to be tested was conditioned for 24 hours at 23° C. and 50 percent relative humidity. Three laps of the loop fastener material was removed from the test roll and the tape folded over at the free end to form a tab. An unwind apparatus having a free turning spindle was placed in the lower jaws of a constant rate tensile tester (INSTRON™ Model 1122) making sure that the spindle turned freely. The tab was then placed in the upper jaw of the tensile tester. At a crosshead speed of 20 inches (0.5 meter) per minute a chart recorder set at a chart speed of 10 inches (25 cm) per minute was used to record the average unwind value for unwinding approximately 6 inch (15 cm) of loop tape. The unwind value was reported in grams/centimeter-width. Reported values are an average of at least five tests.
135° Peel Adhesion from Polyethylene Polyethylene (a 1 mil (25 micron thick) film with a matte finish such as is commonly used for diaper cover stock) was securely adhered to a 2 inch×5 inch (5.1 cm×12.5 cm) steel panel using double-coated adhesive tape. A 1 inch (2.5 cm) wide test strip of loop tape was then adhered on the film and was rolled down by hand, once in each direction, using a 4.5 pound (1000 gram) roller at an approximate rate of 12 inches (30.5 cm) per minute. The panel was placed into the bottom jaw of an INSTRON™ Model 1122 tensile tester while the loop tape was held by the upper jaw. The upper jaw was set in motion at 12 inches (30.5 cm) per minute while the steel panel was moved so as to keep the loop tape at a 135° angle to the panel. The force required to remove the loop tape from the polyethylene was recorded as the peel adhesion value. Reported values are in grams/centimeter-width and are an average of at least five tests.

EXAMPLE 1

A roll of warp knit, weft inserted texturized polyester loop fabric (MILLILOCK™ Style No. 924107-640 available from Milliken Co.) was extrusion coated on the side opposite the upstanding loops with a 2.5 mil (62.5 micron) layer of polypropylene (TENITE™ P9HSM-015 available from Eastman Chemical Co.). A pressure sensitive adhesive (a tackified styrene-butadiene block copolymer-based adhesive like that used on SCOTCHMATE™ SJ3526 Hook Fasteners from Minnesota Mining and Manufacturing Company) was then solution coated onto the polypropylene layer from a 50 percent solids solution in toluene. The thickness of the adhesive layer (after drying) was 33 microns. The loop fastener material was then wound upon itself without a release liner into roll form onto a 3.25 inch (8.3 cm) diameter core. The roll was 2 inches (5.1 cm) in width and the roll diameter was 9.5 inches (24.1 cm).

The roll of loop fastener material was then stored at room temperature for approximately 12 months after which time unwind values were measured for the loop fastener material at different distances from the core. Unwind values were measured to be 165 grams/cm width, 134 grams/cm width, and 192 grams/cm width for distances from the core of 1.3 cm, 3.0 cm, and 4.1 cm, respectively. Dynamic shear strength was measured to be 6945 grams, 135° Peel to be 398 grams/cm-width, and 135° Peel from polyethylene to be 340 grams/cm-width.

EXAMPLE 2 AND COMPARATIVE EXAMPLE A

A roll of warp knit, weft inserted texturized polyester loop fabric (MILLILOCK™ Style No. 924107-640 available from Milliken Co.) was extrusion coated on the side opposite the upstanding loops with a 2.5 mil (62.5 micron) layer of polypropylene (TENITE™ P9H8M-015 available from Eastman Chemical Company). A release coating (a 5 percent solution of polyvinyl N-octadecyl carbamate prepared as described in U.S. Pat. No. 2,532,011) was then coated onto the loop side of the polypropylene backed loop material. The excess solvent was dried in a forced air oven at approximately 170° F. (77° C.) to provide a dried release coating weight on the loops of approximately 0.70 grams/m². A layer of hot melt pressure-sensitive adhesive was then coated onto the polypropylene layer. The adhesive was a tackified KRATON™ 1111 (a styrene-isoprene block copolymer available from Shell Chemical Company) adhesive as described in U.S. Pat. No. 5,019,071. The thickness of the adhesive layer was 50 microns. The loop fastener material was then wound upon itself into roll form without a release liner.

Several test samples were cut from the example loop fastener material and were tested for dynamic shear and 135° peel after being engaged by a hook fastener material (KS-0099 available from 3M Company, similar to that described in U.S. Pat. No. 5,100,400 except without a layer of thermoplastic material). The samples were also tested for 135° peel adhesion to polyethylene. For comparison, test samples were also cut from a roll (referred to herein as Example A) of loop fastener material that was identical to Example 2 described above except that instead of having a release coating on the loops the adhesive was protected by a conventional release liner. Unwind values were also obtained for two separate rolls of the release treated loop fastener material. Results are given in the Table below.

| Example | Shear (gms) | 135° Peel (gms/cm) | 135° Peel from PE (gms/cm) | Unwind (gms/cm) |
|---------|-------------|--------------------|-----------------------------|-----------------|
| 2       | 4500        | 295                | 402                         | 33              |
| A       | 3200        | 228                | 422                         | —               |

The dynamic shear and 135° peel results indicate that better peel and shear values were obtained for the release treated loop fastener material when engaged by a hook fastener material. This demonstrates that the loops on the release treated loop fastener material were less compressed than the loops on the conventional roll of loop fastener material having a protective release liner on the adhesive layer. The 135° peel from polyethylene values for the loop fastener materials are essentially the same, indicating that adhesive properties are not affected by the release coating on the loops.

EXAMPLE 3

A roll of point bonded spun bond nonwoven polypropylene loop fastener material having a basis weight of 20 to 30 grams/m² was thermally bonded (diamond pattern) to a 2.0 mil (50 micron) cast film of an ethylene-propylene impact copolymer resin type 7C-50 available from Shell Chemical Company. The loop fastener material was then coated with a 3 percent solids solution of a reactive silicone in 20:80 methyl ethyl ketone/heptane solvent mixture (SYLOFF™ 294 available from Dow Corning). The sample was then dried and cured at 150° F. (66° C.) for 5 minutes in a forced air oven. A 50 percent solids solution of a tackified KRATON-1111 adhesive (as described in U.S. Pat. No. 5,019, 071) in 1:3 mixture of heptane/toluene was then coated on the film side opposite the loops. The thickness of the adhesive coating was 42 microns. Initial and heat aged (15 days at 120° F.) unwind values were then measured for the loop fastener material and were found to be 13 grams/cm-width and 18.9 grams/cm-width, respectively. 135° peel adhesion to polyethylene was also measured for the loop fastener material before and after heat aging. Initial peel strength was measured as 98 grams/cm-width and the peel strength after heat aging was 122 grams/cm-width. The 135° peel value was essentially unchanged after heat aging which indicates that silicone transfer from the loops to the adhesive layer did not occur.

Various modifications and alterations of this invention will become apparent to those skilled in the art without departing from the scope and spirit of this invention.

What is claimed is:

1. A loop fastener material assembly comprising one or more multilayer sheets of loop fastener material for the loop portion of a hook and loop fastener, said assembly being selected from the group consisting of a stack comprising two or more said sheets of loop fastener material and a roll comprising one or more said sheets of loop fastener material wound together in roll form;

said loop fastener material comprising in order: (1) a loop layer on its first major surface, said loop layer comprising (a) a multiplicity of flexible loops adapted to be releasably engaged by the complementary hook portion of the hook and loop fastener (b) a base layer to which said loops are anchored, (2) a pressure-sensitive adhesive layer on its second major surface and (3) a release control agent selected from the group of release control agents consisting of a release control agent incorporated into said loops prior to arranging said loop fastener material into said assembly, and a release control agent applied to the surface of said loops prior to arranging said loop fastener material into said assembly;

wherein said loop fastener material is arranged in said assembly such that the adhesive layer of an overlying portion of said loop fastener material is in direct contact with the loop layer of an underlying portion of said loop fastener material, said loops being such that, when said overlying portion of said loop fastener material is removed from said assembly, said loops of said underlying portion are presented in an engagable state.

2. The assembly of claim 1 wherein said loops of said underlying portion are such that they are compressed by said overlying portion when arranged in said assembly and are also such that they are restored to an engagable state after removal of said overlying portion.

3. The assembly of claim 2 wherein said adhesive layer adheres sufficiently strongly to said loops that when said overlying portion of said loop fastener material is removed from said assembly, said adhesive tends to pull said loops so as to restore them to an engagable state.

4. The assembly of claim 1 wherein said adhesive layer exhibits a peel force to said loop layer of between about 4 and about 250 grams/centimeter-width.

5. The assembly of claim 1 wherein said adhesive layer exhibits a peel force to said loop layer of between about 8 and 120 grams/centimeter-width.

6. The assembly of claim 1 wherein said adhesive layer exhibits a peel force to said loop layer of between about 8 and about 80 grams/centimeter-width.

7. The assembly of claim 1 wherein said assembly is a roll exhibiting an unwind force of between about 4 and about 250 grams/centimeter-width.

8. The assembly of claim 1 wherein said assembly is a roll exhibiting an unwind force of between about 8 and about 120 grams/centimeter-width.

9. The assembly of claim 1 wherein said loop fastener material has a sheet width of at least one centimeter.

10. The assembly of claim 1 wherein said assembly is a roll having a roll radius of up to 50 centimeters.

11. The assembly of claim 1 wherein said loop layer further comprises a backing bonded between said base layer and said adhesive layer.

12. The assembly of claim 11 wherein said backing is continuous.

13. The assembly of claim 11 wherein said backing is selected from the group consisting of a homopolymer, a copolymer, a blend of polymers, and paper.

14. The assembly of claim 11 wherein said backing is multilayer.

15. The assembly of claim 11 wherein said backing comprises a foamed material.

16. The assembly of claim 11 wherein said backing has a basis weight of between about 5.0 and about 400 grams/meter$^2$.

17. The assembly of claim 11 wherein said backing has a basis weight of between about 10 and about 200 grams/meter$^2$.

18. The assembly of claim 11 wherein said backing has a basis weight of between about 20 and about 100 grams/meter$^2$.

19. The assembly of claim 11 wherein said backing has a thickness between about 5 and about 12,500 microns.

20. The assembly of claim 11 wherein said backing has a thickness between about 25 and about 500 microns.

21. The assembly of claim 11 wherein said backing has a thickness between about 50 and about 250 microns.

22. The assembly of claim 1 wherein said loops are between about 50 and about 250 Denier.

23. A method for dispensing a loop fastener material comprising the steps of:

(1) providing an assembly comprising one or more multilayer sheets of loop fastener material for the loop portion of a hook and loop fastener, said assembly being selected from the group consisting of a stack comprising two or more said sheets of loop fastener material and a roll comprising one or more said sheets of loop fastener material would together in roll form; wherein said loop fastener material comprises in order: (1) a loop layer on its first major surface, said loop layer comprising (a) a multiplicity of flexible loops adapted to be releasably engaged by the complementary hook portion of the hook and loop fastener and (b) a base layer, (2) a pressure-sensitive adhesive layer on its second major surface, and (3) a release control agent selected from the group of release control agents consisting of: a release control agent incorporated into said loops prior to arranging said loop fastener material into said assembly, and a release control agent applied to the surface of said loops prior to arranging said loop fastener material into said assembly wherein said loop fastener material is arranged in said assembly such that the adhesive layer of an overlying portion of said loop fastener material is in direct contact with the loop layer of an underlying portion of said loop fastener material, said loops being such that, when said overlying portion of said loop fastener material is removed from said assembly, said loops of said underlying portion are presented in an engagable state; and (2) removing an overlying portion of said loop fastener material from said assembly such that the adhesive layer of said overlying portion is separated from the loops of said underlying portion, so as to present said loops of said underlying portion in an engagable state.

24. The method of claim 23 wherein the loops of said underlying portion are compressed when contacted by said overlying portion and recover to an engagable state after said overlying portion is removed.

25. The method of claim 24 wherein said adhesive of said overlying portion adheres sufficiently strongly to said loops of said underlying portion that when said overlying portion of said loop fastener material is removed from said assembly, said adhesive tends to pull said loops so as to restore them to engagable state.

26. The method of claim 23 wherein said adhesive layer exhibits a peel force to said loop layer of between about 4 and about 250 grams/centimeter-width.

27. The method of claim 23 wherein said adhesive layer exhibits a peel force to said loop layer of between about 8 and 120 grams/centimeter-width.

28. The method of claim 23 wherein said adhesive layer exhibits a peel force to said loop layer of between about 8 and about 80 grams/centimeter-width.

29. The method of claim 23 wherein said assembly is a stack comprising two or more said sheets of loop fastener material and said removing an overlying portion of said loop fastener material comprises peeling a sheet from said stack.

30. The method of claim 23 wherein said assembly is a roll comprising one or more said sheets of loop fastener material wound together in roll form and said removing an overlying portion of said loop fastener material comprises unwinding a portion of said loop fastener material from said roll.

31. The method of claim 30 wherein said adhesive layer exhibits sufficiently strong adhesion to said loops that when said overlying portion is unwound, the adhesive of said overlying portion tends to pull loops of said underlying portion so as to restore them to engagable state.

32. The method of claim 30 wherein said roll exhibits an unwind force of between about 4 and about 250 grams/centimeter-width.

33. The method of claim 30 wherein said roll exhibits an unwind force of between about 8 and about 120 grams/centimeter-width.

34. The method of claim 23 further comprising bonding said sheet to a substrate with said adhesive layer.

35. The method of claim 23 wherein said loops are between about 50 and about 250 Denier.

* * * * *

UNITED STATES PATENT AND TRADEMARK OFFICE
CERTIFICATE OF CORRECTION

PATENT NO.: 5,605,729

DATED: February 25, 1997

INVENTOR(S): Kirit C. Mody et al.

It is certified that error appears in the above-identified patent and that said Letters Patent is hereby corrected as shown below:

Column 11, claim 1, line 7, after the word "material" insert –having two major opposing surfaces and–.

Column 12, claim 23, line 9, delete "would" and insert therefor –wound–.

Column 12, claim 23, line 10, after the word "material" insert –having two major opposing surfaces and–.

Signed and Sealed this

Twenty-eighth Day of April, 1998

Attest:

BRUCE LEHMAN

Attesting Officer

Commissioner of Patents and Trademarks